United States Patent
Adloff

(10) Patent No.: US 9,413,267 B2
(45) Date of Patent: Aug. 9, 2016

(54) METHOD FOR FEEDING ELECTRICAL POWER INTO A THREE-PHASE AC VOLTAGE SYSTEM

(75) Inventor: Stephan Adloff, Grossefehn (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 13/702,999

(22) PCT Filed: Jun. 10, 2011

(86) PCT No.: PCT/EP2011/059717
§ 371 (c)(1),
(2), (4) Date: Feb. 14, 2013

(87) PCT Pub. No.: WO2011/154532
PCT Pub. Date: Dec. 15, 2011

(65) Prior Publication Data
US 2013/0141951 A1   Jun. 6, 2013

(30) Foreign Application Priority Data

Jun. 10, 2010 (DE) .......................... 10 2010 029 951

(51) Int. Cl.
*H02M 7/42* (2006.01)
*H02J 3/26* (2006.01)
*H02J 3/38* (2006.01)
*H02J 3/44* (2006.01)

(52) U.S. Cl.
CPC .. *H02M 7/42* (2013.01); *H02J 3/26* (2013.01); *H02J 3/386* (2013.01); *H02J 3/44* (2013.01); *Y02E 10/763* (2013.01); *Y02E 40/50* (2013.01)

(58) Field of Classification Search
None
See application file for complete search history.

(56) References Cited

U.S. PATENT DOCUMENTS

| 5,036,451 A | * | 7/1991 | Rozman | H02M 7/53873 363/41 |
| 5,148,362 A | * | 9/1992 | Braun et al. | 363/95 |
| 5,883,796 A | * | 3/1999 | Cheng | H02J 3/1814 307/105 |

(Continued)

FOREIGN PATENT DOCUMENTS

| DE | 26 43 934 B1 | 1/1978 |
| DE | 10 2007 005 165 A1 | 8/2007 |

(Continued)

OTHER PUBLICATIONS

Malengret, M., Farquharson, A., and Enslin, J.H.R., "Negative Sequence Current Cancellation with DSP and Space Vector Controlled PWM modulated Inverter," IEEE Conference Publications, Proceedings of the 1998 South African Symposium on Communications and Signal Processing, 1998, 237-242.*

(Continued)

*Primary Examiner* — Timothy J Dole
*Assistant Examiner* — Monica Mata
(74) *Attorney, Agent, or Firm* — Seed IP Law Group PLLC

(57) ABSTRACT

The present invention relates to a method for feeding an unbalanced, three-phase current into a three-phase AC voltage system, comprising the steps of: producing a positive phase-sequence system for the current to be fed in, producing a negative phase-sequence system for the current to be fed in, superimposing the positive phase-sequence system and the negative phase-sequence system to form the current to be fed in and feeding the current composed in this manner into the three-phase AC voltage system.

18 Claims, 2 Drawing Sheets

(56) References Cited

U.S. PATENT DOCUMENTS

| | | | | |
|---|---|---|---|---|
| 5,969,957 | A | * | 10/1999 | Divan ................... H02M 5/458 318/768 |
| 6,008,616 | A | * | 12/1999 | Nagayama .......... B60L 11/1803 318/773 |
| 6,014,017 | A | * | 1/2000 | Weinhold ............. H02J 3/1842 323/207 |
| 2002/0113562 | A1 | * | 8/2002 | Raith et al. .................... 318/114 |
| 2003/0218887 | A1 | * | 11/2003 | Kojori et al. ..................... 363/16 |
| 2010/0033140 | A1 | * | 2/2010 | Otake ...................... B60L 3/04 320/165 |
| 2010/0052322 | A1 | * | 3/2010 | Fortmann et al. ................ 290/44 |
| 2011/0295437 | A1 | * | 12/2011 | Lu et al. ......................... 700/287 |
| 2012/0013283 | A1 | * | 1/2012 | Tallam ................ H02M 5/4585 318/400.26 |

FOREIGN PATENT DOCUMENTS

| | | |
|---|---|---|
| EP | 0 471 106 A1 | 2/1992 |
| EP | 0 796 517 B1 | 3/1999 |
| JP | 06-038532 A | 2/1994 |
| JP | 11-346441 A | 12/1999 |
| JP | 2001-298956 A | 10/2001 |
| WO | 2008/061698 A2 | 5/2008 |

OTHER PUBLICATIONS

Song et al., "Dual Current Control Scheme for PWM Converter Under Unbalanced Input Voltage Conditions," *IEEE Transactions on Industrial Electronics* 46(5):953-959, Oct. 1999.

Alepuz, S. et al., "Control Strategies Based on Symmetrical Components for Grid-Connected Converters Under Voltage Dips," IEEE Transactions on Industrial Electronics, IEEE Service Center, Piscataway, NJ, vol. 56, No. 6, Jun. 1, 2009, 12 pgs.

Bongiorno, M. et al., "Dynamic Performance of Current Controllers for Grid-connected Voltage Source Converters Under Unbalanced Voltage Conditions," Proc. of IEEE Nordic Workshop on Power and Industrial Electronics (NORpie 2004) Jan. 1, 2004, 7 pgs.

Magueed, F. et al., "Transient Performance of Voltage Source Converter Under Unbalanced Voltage Dips," IEEE Power Electronics Specialists Conference, Aachen, Germany, 2004, 6 pgs.

\* cited by examiner

METHOD FOR FEEDING ELECTRICAL POWER INTO A THREE-PHASE AC VOLTAGE SYSTEM

BACKGROUND

1. Technical Field

The present invention relates to a method for feeding an unbalanced, three-phase current into a three-phase AC voltage system. The present invention also relates to a corresponding apparatus for feeding an unbalanced current into a three-phase AC voltage system and to a wind power installation provided with such an apparatus.

2. Description of the Related Art

Electrical power is largely distributed in a three-phase AC voltage system, in particular from power producers, such as large power stations, wind power installations or the like, to the consumer. In particular, the consumers adapt in this case to an AC voltage system having particular properties. These include a particular frequency and phase of the individual voltages, the voltage amplitude of each phase and finally also a certain balance of the AC voltage system. Each phase of the three-phase system ideally has, for example for the European interconnected grid system, a root-mean-square value of the voltage of 235 V, a frequency of 50.0 Hz and a phase angle with respect to the respective other two phases of 120° and 240°. Compliance with such properties is an important requirement and deviations are only permissible in certain limits. Excessive deviations may both threaten the stability of the respective three-phase AC voltage system and cause damage in the case of sensitive consumers.

In order to ensure that the required properties are complied with, in particular to ensure that the three-phase AC voltage system is balanced, power producers, in particular large power stations, feed this AC voltage system in a balanced manner. Larger consumers such as factories with large machines must ensure that the AC voltage system is not loaded in an unbalanced manner or is loaded in an unbalanced manner only to a very small extent.

For small consumers, it is assumed that these, on the whole, load the AC voltage system substantially only in a balanced manner for statistical reasons alone.

Nevertheless, the situation may arise in which there is unbalanced loading or possibly unbalanced feeding. An unbalanced system may be the result, at least in sections. In this case, it is desirable or even necessary—depending on the severity of the unbalance—to compensate for the unbalance in the AC voltage system. Large power stations may often not carry out such compensation because they often feed the system by means of a synchronous generator which is directly coupled to the AC voltage system. It is virtually impossible to individually intervene in the individual phases of the synchronous generator during operation and if required.

In the case of feeding by a wind power installation by means of a full converter, it would be conceivable, in principle, to predefine, produce and feed in an unbalanced three-phase alternating current if the full converter used has such a capability. In such a case, each bridge branch of the full converter feeds a different amount of current into the AC voltage system.

Such feeding-in of different currents may result in an uneven load and possibly excessively large loads. If the full converter is operated up to the permissible power limit and feeds the system in an unbalanced manner in this case, this may mean that the load limit for an individual bridge branch is exceeded. Increased ageing of the components or even an acute malfunction can accordingly be expected.

BRIEF SUMMARY

One or more embodiments of the present invention is based on the object of eliminating or reducing at least one of the abovementioned problems. In particular, one intention is to provide a solution for compensating for or partially compensating for an unbalanced situation in a three-phase AC voltage system, in which case at least one of the abovementioned problems is intended to be avoided or reduced. The intention is preferably to propose a solution for feeding an unbalanced, three-phase alternating current into an AC voltage system while avoiding at least one of the abovementioned problems. The intention is to at least propose an alternative solution.

One or more embodiments of the invention is based on the knowledge that an unbalanced, three-phase AC voltage system can, in principle, be represented by a positive phase-sequence system component and a negative phase-sequence system component. The method of symmetrical components for carrying out simplified analysis of an unbalanced fault in a three-phase system, that is to say a three-phase AC system, is known, in principle, from electrical engineering. In this case, an unbalanced system of so-called phasors is divided into positive phase-sequence systems, negative phase-sequence systems and zero phase-sequence systems.

The positive phase-sequence system, which can also be referred to as the positive phase-sequence system component, has the same direction of rotation as the original system. The negative phase-sequence system, which can also be referred to as the negative phase-sequence system component, has an opposite direction to the original system. It fundamentally compensates for the deviation of the phasors from the conventional 120° phase shift. The positive phase-sequence system as such and also the negative phase-sequence system as such are each balanced per se.

The zero phase-sequence system denotes a system in which all phasors have the same direction and the same length. This zero phase-sequence system compensates for any deviation of the addition of the original system from zero. However, in the present case, it was recognized that it is often possible to dispense with a zero phase-sequence system or a zero phase-sequence system component. In any case, one embodiment proposes dispensing with a zero phase-sequence system.

The underlying theory of symmetrical components has hitherto been used to analyze and describe an unbalanced three-phase system. The positive phase-sequence system and the negative phase-sequence system component can thus each be described by magnitude and phase. Further analysis is possible with these values.

It is now proposed to produce both a positive phase-sequence system and a negative phase-sequence system and to superimpose the positive and negative phase-sequence systems produced in this manner to form the desired unbalanced system to be fed in, namely, in particular, the unbalanced three-phase alternating current. The unbalanced three-phase total current thus produced from superimposition can then be fed into the three-phase AC voltage system.

It is now possible to produce a balanced positive phase-sequence system with the aid of a three-phase inverter module. Only a standard task is therefore set for this three-phase inverter module, namely that of producing a balanced three-phase alternating current. Since this inverter module must only produce a balanced three-phase alternating current, no problems as a result of any unbalanced loading or overloading of a bridge branch result either.

Another inverter module may produce a negative phase-sequence system. Only a standard task of producing a balanced, three-phase alternating current is also hereby set for this inverter module.

This positive phase-sequence system and the negative phase-sequence system can be simply superimposed by connecting each of the respective phases to a common node. This can be carried out upstream or downstream of an output inductor.

The two inverter modules may have partially common components. In the case of a respective inverter module which uses a DC voltage intermediate circuit in particular, a common DC voltage intermediate circuit and accordingly also one or more common rectifiers for feeding electrical power into the DC voltage intermediate circuit can be used for both inverter modules.

The example of one inverter module for the positive phase-sequence system and one inverter module for the negative phase-sequence system is one embodiment which is also highly suitable for explaining a fundamental concept.

Other embodiments propose using more than two inverter modules, namely using a second inverter module at least for the positive phase-sequence system or for the negative phase-sequence system. A large number of inverter modules are preferably used. The positive phase-sequence system and the negative phase-sequence system are calculated for the unbalanced three-phase alternating current to be produced. Depending on the amplitude of the respective systems, a correspondingly large number of inverter modules are used to produce the positive phase-sequence system and a correspondingly large number of inverter modules are used to produce the negative phase-sequence system. It is thus possible to use a plurality of inverter modules with the same dimensions. The amplitude of the positive phase-sequence system and of the negative phase-sequence system is then only achieved by the number of inverter modules with the same dimensions used. Substantially uniform division can be achieved as a result.

The respective positive phase-sequence system accordingly includes a plurality of positive phase-sequence subsystems, and/or the negative phase-sequence system accordingly includes a plurality of negative phase-sequence subsystems. The positive and negative phase-sequence subsystems are each produced by an inverter module and are then superimposed. During superimposition, the positive phase-sequence subsystems may first of all be superimposed to form the positive phase-sequence system and/or the negative phase-sequence subsystems can be superimposed to form the negative phase-sequence system in order to then be superimposed together to form the unbalanced, three-phase alternating current, or the positive and negative phase-sequence subsystems are all superimposed together to form the total unbalanced three-phase alternating current to be fed in.

The respective phases and amplitudes of the positive phase-sequence systems, if appropriate of the positive phase-sequence subsystems, of the negative phase-sequence systems and/or, if appropriate, of the negative phase-sequence subsystems are preferably predefined by a common central unit. Such a central unit can computationally divide the unbalanced three-phase alternating current to be fed in into the positive phase-sequence systems and negative phase-sequence systems to be provided and produced, if appropriate also into the further subdivision into positive and negative phase-sequence subsystems. The central unit—which is usually provided with the information relating to the available inverter modules—can therefore carry out overall division and can thus ensure that the unbalanced, three-phase alternating current is fundamentally composed of a multiplicity of identical balanced three-phase current components. In this case, the central unit preferably takes into account the available total active power of the available inverter modules. When feeding in electrical energy or power obtained by a wind power installation in particular, the amplitude of this energy or power can be detected and the current to be produced can be divided accordingly.

An apparatus prepared for this also readily makes it possible to control balanced feeding. In this case, only a positive phase-sequence system and no negative phase-sequence system would need to be produced.

All positive phase-sequence subsystems preferably have the same phases and/or amplitudes, and/or all negative phase-sequence subsystems in turn have the same phases and amplitudes.

This allows uniform division which minimizes any loads on components used and makes it possible to simplify both the calculation and the production.

A method is preferably proposed, which is characterized in that the positive phase-sequence system and the negative phase-sequence system are each produced by at least one separate inverter module, and/or a or the central control unit predefines which inverter module or which of the inverter modules produce(s) a positive phase-sequence system and which inverter module or which of the inverter modules produce(s) a negative phase-sequence system.

As a result of the fact that both the positive phase-sequence system and the negative phase-sequence system are each produced by at least one separate inverter module, each inverter module may be restricted to the production of a balanced three-phase alternating current. The control unit preferably predefines which inverter module or which of the inverter modules produce(s) a positive phase-sequence system and which inverter module or which of the inverter modules produce(s) a negative phase-sequence system. This also means that the inverter modules used are not tied to the production of a positive phase-sequence system or the production of a negative phase-sequence system. Rather, a different number of inverter modules can be used to produce a positive phase-sequence system and likewise a different number of inverter modules can be respectively used to produce a negative phase-sequence system if required.

The use of one or more inverter modules is preferably changed if requirements change. Accordingly, an exemplary inverter module may first of all produce a positive phase-sequence system and may later change to producing a negative phase-sequence system or vice versa.

One or more embodiments are directed to an apparatus comprising at least one first inverter module for producing a positive phase-sequence system for the current to be fed in and a second inverter module for producing a negative phase-sequence system for the current to be fed in. The two inverter modules are coupled in such a manner that the positive phase-sequence system is superimposed with the negative phase-sequence system to form a current to be fed in, namely a total current to be fed in. For this purpose, the current outputs, in particular, of the inverter modules are accordingly connected. This may be provided upstream or downstream of an inductor.

The first inverter module may preferably be assisted by further inverter modules when producing the positive phase-sequence system, and the second inverter module may be assisted by further inverter modules when producing the negative phase-sequence system.

The at least one first inverter module and the at least one second inverter module are preferably coupled via a common DC voltage intermediate circuit in order to produce the respective positive phase-sequence system or negative phase-sequence system from the DC voltage of the common DC voltage intermediate circuit. In this respect, different inverter modules produce different components of the unbalanced three-phase current to be fed in but use a common source. In particular, such a common DC voltage intermediate circuit can be fed by a common source, for example a photovoltaic installation or a wind power installation, or the current produced by a generator of a wind power installation. This also has the advantage that changes in the production of the positive phase-sequence system and the negative phase-sequence system fundamentally have no effect on the DC voltage intermediate circuit and thus the upstream source which feeds the latter. At least one of the inverter modules may also be newly classified, namely producing a positive phase-sequence subsystem instead of a negative phase-sequence subsystem or vice versa, without this having to affect the source which feeds the DC voltage intermediate circuit.

A preferred embodiment is thus that at least one of the at least first inverter module and/or of the at least second inverter module is prepared to produce either a positive phase-sequence system or a part of the latter or a negative phase-sequence system or a part of the latter.

An apparatus is preferably provided, which is characterized in that a central control unit is provided for the purpose of predefining desired values for magnitude and phase for producing the respective negative phase-sequence system or positive phase-sequence system and/or for the purpose of determining which of the first and second inverter modules is used to produce a positive phase-sequence system and which is used to produce a negative phase-sequence system.

A jointly controlled apparatus which nevertheless provides different current components which are superimposed for feeding can thus be provided in a simple and efficient manner.

A data bus system is preferably provided for communication between the inverter modules and, if appropriate, for communication with the central control unit. As a result, data can be easily interchanged between the individual inverter modules and the central control unit in order to control the individual components and to achieve a mutually matched overall behavior of the apparatus. Such a data bus system is also advantageous when a multiplicity of inverter modules are provided and are possibly not accommodated in the same housing. For example, a multiplicity of inverter modules may be provided in the tower base of a wind power installation, which modules have a common DC voltage intermediate circuit, in particular a DC voltage intermediate circuit which is in the form of a so-called busbar. If gaps are provided between the individual inverter modules, this may be advantageous for cooling the modules. When also replacing or maintaining an inverter module, the latter may easily be disconnected from the DC voltage intermediate circuit and also from the data bus, and a replacement module or the module on which maintenance has been carried out can be used at that point. This enables a modular structure and nevertheless central control of the overall feeding apparatus.

Such a modular design also makes it possible to provide identical inverter modules for feeding apparatuses having different total powers. These different total powers—for example for use in wind power installations of different sizes—can be easily achieved by providing the corresponding number of inverter modules.

A wind power installation having an apparatus according to embodiments of the invention for feeding an unbalanced three-phase current is preferably proposed. One embodiment of such a wind power installation has, in particular, a rotor with a rotor hub and one or more rotor blades in order to convert wind into a rotational movement of the rotor. An electrical generator, in particular a synchronous generator, is also provided and has an electromagnetic rotor which is driven by the aerodynamic rotor just described in order to produce electrical current. This electrical current is used, after corresponding conversion, to be fed into the AC voltage system using the feeding apparatus. For this purpose, the current produced by the generator, for example, may be rectified and fed into a DC voltage intermediate circuit to which inverter modules are connected in order to carry out the feeding operation. The apparatus is preferably arranged in or on a tower of the wind power installation on which the described rotor and generator are arranged and supported.

One particular advantage of using a wind power installation having an apparatus according to the invention for feeding an unbalanced three-phase current into a three-phase AC voltage system is that unbalances may occur, in particular, in decentralized sections of an AC voltage system. The use of a wind power installation makes it possible to likewise set up the latter in a decentralized manner and thus to counteract an unbalance in this decentralized system section in a targeted manner.

For the rest, the practice of removing electrical power from an AC voltage system having an unbalance and converting said power into an unbalanced, three-phase current which counteracts said unbalance is also taken into consideration here. A wind power installation can thus contribute to balancing an unbalance in an AC voltage system if required, even in the case of calm conditions.

One or more embodiments of the present invention is also provided, in particular, for the purpose of implementing requirements demanded by guidelines such as the technical guideline "BDEW, Technical Guideline Generation Systems on Medium Voltage Grid, Guideline for Connection and Parallel Operation of Generating Plants at Medium Voltage Network, Juni 2008" [BDEW (German Federation of Energy and Water Industries), Technical guideline for production installations in the medium-voltage system, guideline for connection and parallel operation of production installations in the medium-voltage system, June 2008]. One or more embodiments of the invention is likewise intended to operate in accordance with feed guidelines and, in particular, recent demands imposed on the system quality by such guidelines. This also relates, in particular, to the regulation on system services provided by wind power installations, 10 Jul. 2009.

According to one embodiment, the apparatus according to the invention for feeding an unbalanced three-phase current forms a production unit or part of a production unit in the sense of the BDEW medium-voltage guideline.

BRIEF DESCRIPTION OF THE SEVERAL VIEWS OF THE DRAWINGS

The present invention is explained in more detail below by way of example using exemplary embodiments and with reference to the accompanying figures, in which.

DETAILED DESCRIPTION

Figure 1:
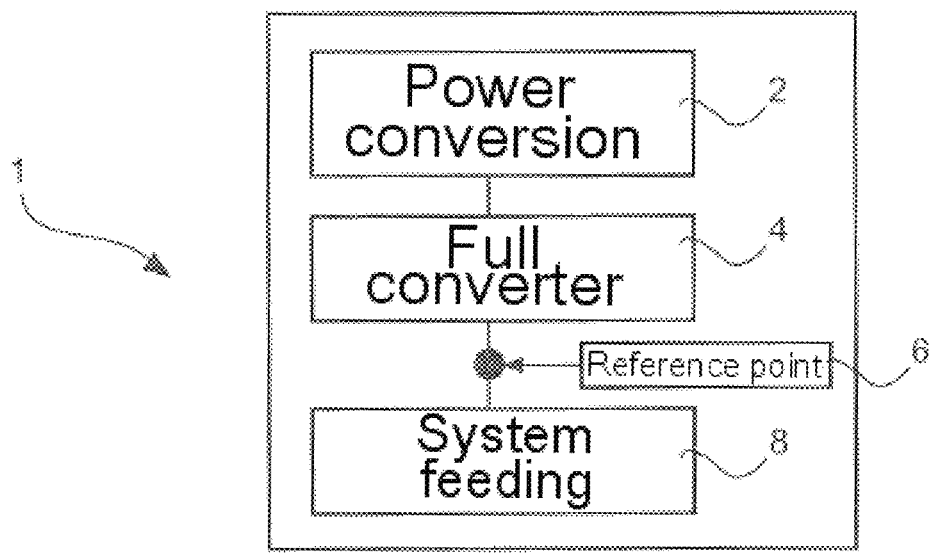
FIG. 1 schematically shows a structure of a production unit according to one embodiment of the present invention.

The production unit 1 according to the schematic illustration in FIG. 1 comprises a power conversion section 2 which obtains electrical power from another form of energy. For example, a wind power installation can be used to convert energy from the wind into electrical current via an aerodynamic rotor and an electrical generator. A transmission may be provided between the aerodynamic rotor and the electrical generator, which transmission is not important in the present case. A solar cell which can obtain electrical power from solar radiation may be mentioned as a further example for obtaining electrical power from another form of energy.

In order to prepare this electrical power obtained in the power conversion section 2 for feeding into an electrical AC voltage system, a full converter 4 is provided. The entire electrical power obtained by the power conversion section 2 is fundamentally passed via this full converter 4 in order to be fed into the AC voltage system. In this case, the full converter produces at least one positive phase-sequence system and at least one negative phase-sequence system which are superimposed at the reference point 6 in order to then be fed into the system in the form of a common, unbalanced total current. A system feeding block 8 is shown for illustration for this purpose.

In production units, such as the production unit 1 with the full converter 4, the feeding behavior is characterized by the converter or full converter. The manner in which the feeding operation is carried out, for example in terms of the active/reactive power and phase angle, is determined by driving power semiconductors contained in the converter. Unbalanced power feeding could be achieved by unbalanced current feeding. In such a case, the current which has been fed in includes a positive phase-sequence system and a negative phase-sequence system, which results in an unbalanced total current of the production unit.

Figure 2A:
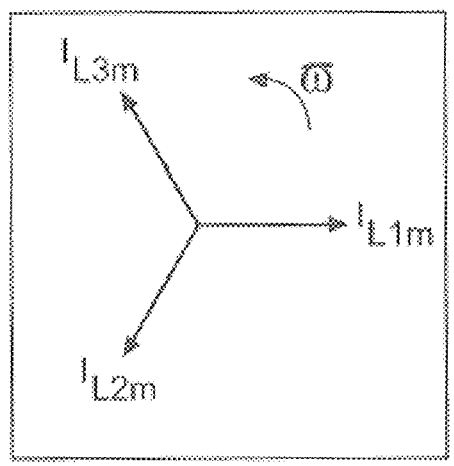
FIGS. 2a to 2c explain the composition of an unbalanced three-phase alternating current (FIG. 2c) from a positive phase-sequence system (FIG. 2a) and a negative phase-sequence system (FIG. 2b)
Figure 2B:
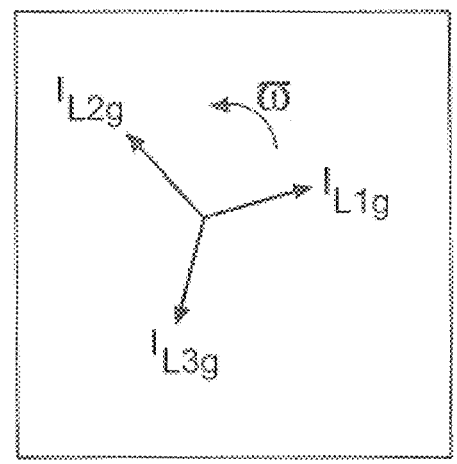
Figure 2C:
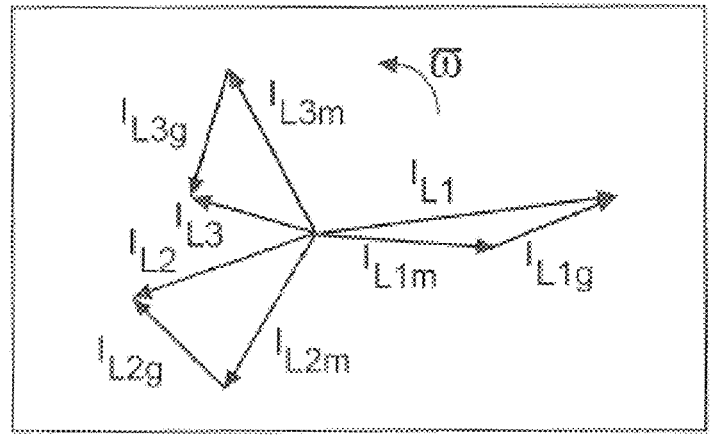

The production of the unbalanced three-phase alternating current to be fed in is explained using phasor diagrams in FIGS. 2a to 2c. For the sake of simplicity, this explanation is based on an unbalanced three-phase total current includes a positive phase-sequence system and a negative phase-sequence system. The positive phase-sequence system is illustrated in FIG. 2a. The latter shows the amplitude and phase of the three currents $I_{L1m}$, $I_{L2m}$ and $I_{L3m}$. The angular frequency of the phasor system illustrated is indicated by ω. The angular frequency ω results in a phase sequence $I_{L1m}$, $I_{L2m}$ and $I_{L3m}$. The phases between the three currents $I_{L1m}$, $I_{L2m}$ and $I_{L3m}$ are 120° and 240°, respectively. The amplitudes of the three currents $I_{L1m}$, $I_{L2m}$ and $I_{L3m}$ are the same. In this respect, there is a balanced, three-phase current.

The negative phase-sequence system according to FIG. 2b shows three phasors for the three currents $I_{L1g}$, $I_{L3g}$ and $I_{L2g}$ which likewise have a phase angle of 120° and 240° and each have the same amplitude. The angular frequency is also indicated by ω for the negative phase-sequence system. The negative phase-sequence system is thus also balanced.

At least two balanced, three-phase currents are therefore produced.

The overall system then results from the superimposition of the positive phase-sequence system and the negative phase-sequence system. This means that the currents of a phase of both systems are added in each case. The system superimposed in this manner is illustrated in FIG. 2c. The phasors $I_{L1}$, $I_{L2}$ and $I_{L3}$ represent the three currents of the resultant unbalanced, superimposed, three-phase total current. The phasor $I_{L1}$ accordingly results from the vectorial addition of the phasor $I_{L1m}$ of the positive phase-sequence system according to FIG. 2a and the phasor $I_{L1g}$ according to the negative phase-sequence system in FIG. 2b. $I_{L2m}$ and $I_{L2g}$ are accordingly added to form $I_{L2}$ and $I_{L3m}$ and $I_{L3g}$ are added to form $I_{L3}$. This is illustrated in FIG. 2c. The rotation of this unbalanced overall system is also given by ω. The rotation ω is the same for the positive phase-sequence system according to FIG. 2a, the negative phase-sequence system according to FIG. 2b and the total current according to FIG. 2c.

It can therefore be seen from FIG. 2c that a three-phase unbalanced total current results from superimposition of two three-phase balanced currents.

In order to produce a total current $I_{L1}$, $I_{L2}$ and $I_{L3}$ illustrated in FIG. 2c, a full converter, which does not have a modular structure and has one inverter bridge available for each phase for example, would have to allow its valves, in particular semiconductor switches, to be driven in an unbalanced manner when feeding in an unbalanced current. However, even in the case of a full converter which has a modular structure and has a plurality of inverter modules which each separately produce a three-phase current, an unbalanced total current can be produced by virtue of each inverter module producing an unbalanced partial current and all unbalanced partial currents produced being superimposed to form the unbalanced total current. In particular, each inverter module could produce an unbalanced partial current which corresponds to the unbalanced total current in terms of phase and phase angle but has smaller amplitudes.

Figure 3:
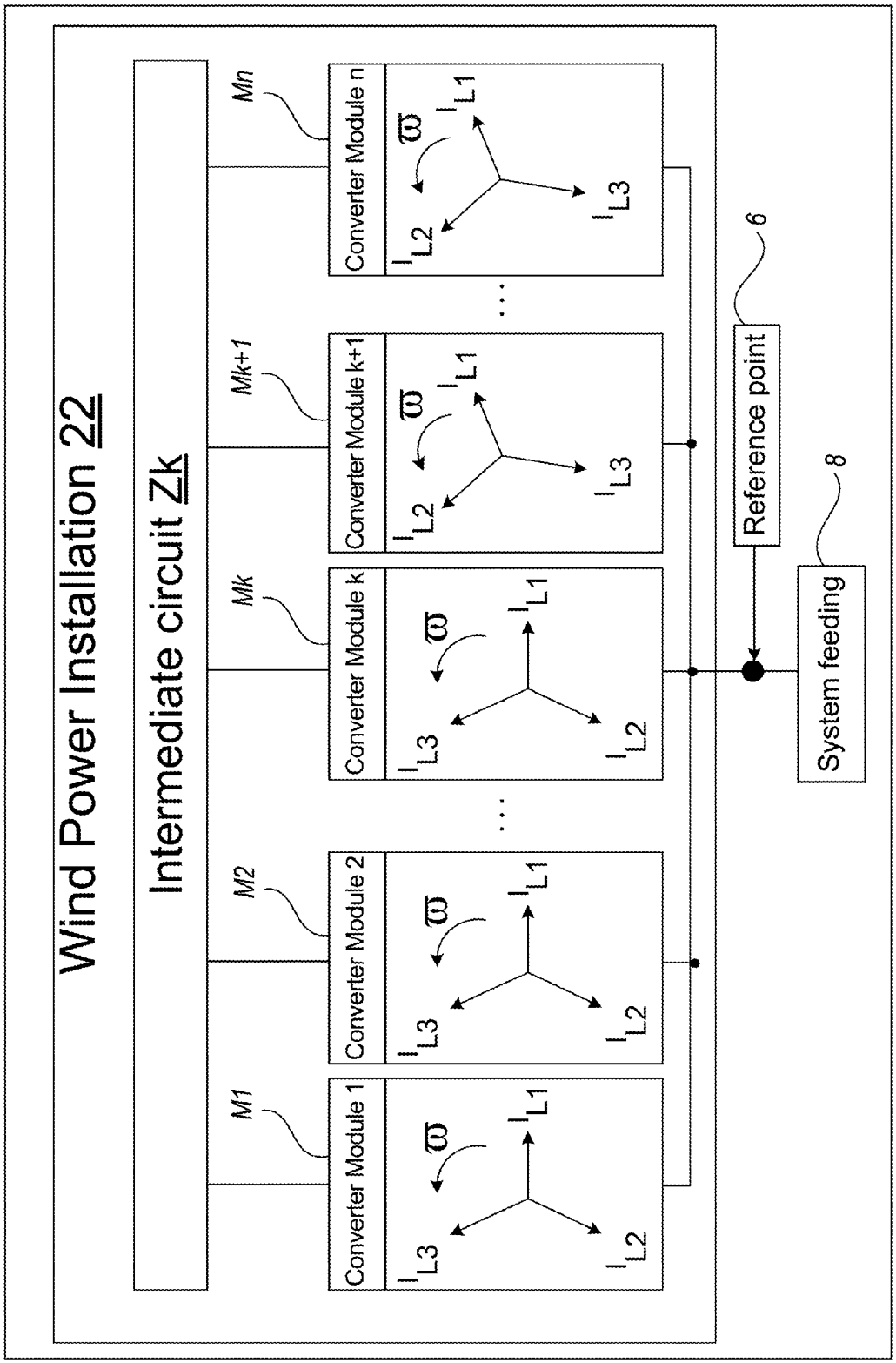
FIG. 3 schematically shows a wind power installation having a full converter including a plurality of converter modules according to one embodiment of the present invention.

However, in the case of a full converter with a modular structure, it is not necessary to drive the valves or semiconductor switches in an unbalanced manner. Instead, each converter module can feed in a balanced current by virtue of the total current feed not being uniformly divided among the converter modules. Rather, one or more embodiments of the invention provides for a feed characteristic to be defined in which, depending on the required unbalance, a particular number of converter modules feed in a pure positive phase-sequence system, that is to say a pure positive phase-sequence system current, that is to say a three-phase current according to FIG. 2a, while the other modules feed in a pure negative phase-sequence system, that is to say a pure negative phase-sequence system current, that is to say a three-phase current according to FIG. 2b. Such division is illustrated in FIG. 3. The converter modules shown form inverter modules, as described above, or the converter modules may also be referred to as inverter modules.

FIG. 3 shows a wind power installation 22 having a common DC voltage intermediate circuit Zk to which a multiplicity of converter modules M1, M2 to Mk and Mk+1 to Mn are connected. These converter modules M1 to Mn form a converter in the sense of the full converter 4 according to FIG. 1. The converter modules M1 to Mk each produce a positive phase-sequence system, that is to say a positive phase-sequence system current. The other converter modules Mk+1 to Mn each produce a negative phase-sequence system, that is to say a negative phase-sequence system current according to FIG. 2b. The currents produced in this manner are superimposed at the reference point 6 or beforehand and are then fed into the AC voltage network, as is illustrated by the block 8. The superimposition at the reference point of the producer unit accordingly results in an unbalanced total current.

Depending on the control method and thus depending on the selected embodiment, the converter modules are driven in groups, namely a so-called positive phase-sequence system group and a so-called negative phase-sequence system group, the amplitude and phase angle of the respective module currents being identical within a group, or each individual module is driven. In this second case, the amplitude and phase angle may differ from converter module to converter module.

In particular if the converter modules are driven in groups and a central control unit is provided and drives the groups and possibly also classifies the groups, it is possible to divide the power to be fed in overall to all modules M1 to Mn in a substantially uniform manner if this is possible as a result of the existing number of converter modules M1 to Mn.

The unbalanced three-phase current to be fed in can be predefined by external inputs by the operator of the AC voltage system, for example, or the production unit and/or central control unit to be used detect(s) an unbalance in the AC voltage system and independently calculate(s) an unbalanced current to be fed in order to counteract the unbalance detected in the system.

A production unit having a wind power installation 22 (see FIG. 3) is advantageously used. It is advantageous to use a wind power installation which has a variable speed and uses a synchronous generator. During operation, the synchronous generator produces an electrical current which is rectified and is used to feed a DC voltage intermediate circuit, such as the DC voltage intermediate circuit Zk in FIG. 3. As a result, speed control of the wind power installation can be substantially decoupled from the feed to the electrical AC voltage system. A multiplicity of inverter modules are connected to the intermediate circuit, which inverter modules can resort to the power in the intermediate circuit and, as described, can produce positive phase-sequence system currents and negative phase-sequence system currents for superimposition to form the unbalanced total current.

If a plurality of converter modules, for example the converter modules M1 to Mk, produce a positive phase-sequence system current, the current produced by one module can be respectively referred to as a positive phase-sequence subsystem or positive phase-sequence subsystem current. If a plurality of converter modules, such as the converter modules Mk1 to Mn, produce a negative phase-sequence system current, the negative phase-sequence system current produced by each converter module can accordingly be referred to as a negative phase-sequence subsystem or negative phase-sequence subsystem current.

The present invention can therefore be used in the field of converter control. A converter which has a modular structure and in which the converter modules can be driven individually or in groups is preferably used. The invention is also used when complying with system connection guidelines, in particular within the scope of feeding electrical power into the public system, namely into the public AC voltage system or AC voltage network.

The purpose is to achieve unbalanced feeding by a production unit. Such unbalanced feeding by a production unit also comprises, inter alia, a full converter which has a modular structure and is used to feed the system. In this case, the present invention is used to stabilize the system in the case of unbalanced system voltages with an unbalanced power output.

A method in which each converter module carries out unbalanced feeding results in unbalanced loading of the operating means. Unbalanced feeding is unfavorable, possibly even impossible or impermissible, especially for converters optimized for balanced feeding, if previously irrelevant components are redimensioned. In other words, an entirely new inverter would have to be designed. With the proposed solution, each converter module separately feeds in balanced current. For the components, there is therefore—in any case in terms of loading—no difference from normal operation which is present when feeding is carried out in a balanced manner overall.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding an unbalanced, three-phase current into a three-phase AC voltage system, the method comprising:
   using at least one first DC connection to provide a first electrical signal to at least one first inverter module,
   using at least one second DC connection to provide a second electrical signal to at least one second inverter module,
   using the at least one first inverter module to generate a positive phase-sequence system having a first set of components for the current to be fed in,
   using the at least one second inverter module to generate a negative phase-sequence system having a second set of components for the current to be fed in, the second set of components being offset from the first set of components,
   superimposing the positive phase-sequence system and the negative phase-sequence system to form a superimposed unbalanced, three-phase current to be fed in, and
   feeding the superimposed unbalanced, three-phase current into the three-phase AC voltage system.

2. The method as claimed in claim 1, further comprising a common DC voltage source, wherein the at least one first DC connection and the at least one second DC connection are coupled to the common DC voltage source and the first electrical signal and the second electrical signal are the same signals.

3. The method as claimed in claim 1, wherein the positive phase-sequence system includes a plurality of positive phase-sequence subsystems, and/or the negative phase-sequence system includes a plurality of negative phase-sequence subsystems.

4. The method as claimed in claim 3, wherein the respective phases and amplitudes of at least one of the positive phase-sequence system, the positive phase-sequence subsystems, the negative phase-sequence system and the negative phase-sequence subsystems are predefined by a common central unit.

5. The method as claimed in claim 3, wherein each of the positive phase-sequence subsystems has at least one of same phases and same amplitudes with each other.

6. The method as claimed in claim 5, wherein each of the negative phase-sequence subsystems has at least one of same phases and same amplitudes as each other.

7. The method as claimed in claim 1, wherein using at least one first inverter module comprises using a plurality of first inverter modules to produce the positive phase-sequence system, and using at least one second inverter module comprises using a plurality of second inverter modules to produce the negative phase-sequence system.

8. The method as claimed in claim 7, further comprising a central control unit that identifies which one of the first inverter modules was used for producing the positive phase-sequence system and which one of the second inverter modules was used for producing the negative phase-sequence system.

9. The method as claimed in claim 7, wherein the plurality of positive phase-sequence subsystems are generated by a respective plurality of first inverters and each first inverter of the plurality of first inverters is electrically coupled to the same first DC connection or different first DC connections and/or the plurality of negative phase-sequence subsystems are generated by a respective plurality of second inverters and each second inverter of the plurality of second inverters is electrically coupled to the same second DC connection or different second DC connections.

10. An apparatus for feeding an unbalanced, three-phase current into a three-phase AC voltage system, the apparatus comprising:
    at least one first DC connection configured to provide a first electrical signal;
    at least one second DC connection configured to provide a second electrical signal;
    at least one first inverter module electrically coupled to the at least one first DC connection and configured to generate a positive phase-sequence system for the current to be fed in,
    at least one second inverter module electrically coupled to the at least one second DC connection and configured to generate a negative phase-sequence system for the current to be fed in,
    a node system configured to receive the positive and negative phase-sequence systems and superimpose the positive phase-sequence system with the negative phase-sequence system to form an unbalanced, three phase current; and
    one or more power supply lines configured to receive the unbalanced, three phase current and feed the unbalanced, three phase current into the three-phase AC voltage system.

11. The apparatus as claimed in claim 10, further comprising at least one common DC voltage intermediate circuit coupled to the at least one first DC connection and the at least one second DC connection, the at least one common DC voltage intermediate circuit being configured to provide the at least one first DC connection with the first electrical signal and to provide the at least one second DC connection with the second electrical signal.

12. The apparatus as claimed in claim 10, further comprising a central control unit for predefining desired values for magnitude and phase for producing the respective negative phase-sequence system or positive phase-sequence system and/or for determining which of the first and second inverter modules is used to produce a positive phase-sequence system and which is used to produce a negative phase-sequence system.

13. The apparatus as claimed in claim 10, further comprising a data bus system for communication between the inverter modules and for communication with the central control unit.

14. A wind power installation comprising:
    an apparatus for feeding an unbalanced, three-phase current into a three-phase AC voltage system, the apparatus comprising:
    at least one first DC connection configured to provide a first electrical signal;
    at least one second DC connection configured to provide a second electrical signal;
        at least one first inverter module electrically coupled to the at least one first DC connection and configured to generate a positive phase-sequence system having a first set of components for the current to be fed in;
        at least one second inverter module electrically coupled to the at least one second DC connection and configured to generate a negative phase-sequence system having a second set of components for the current to be fed in, the second set of components being offset from the first set of components, and
        a circuit configured to receive the positive and negative phase-sequence systems and superimpose the positive phase-sequence system with the negative phase-sequence system to form the unbalanced, three-phase current to be fed in.

15. The wind power installation as claimed in claim 14, further comprising a common DC voltage intermediate circuit coupled to the at least one first DC connection and the at least one second DC connection, the common DC voltage intermediate circuit being configured to provide the at least one first DC connection with the first electrical signal and to provide the at least one second DC connection with the second electrical signal.

16. The wind power installation as claimed in claim 14, wherein the wind power installation further includes a central control unit for predefining desired values for magnitude and phase for producing the respective negative phase-sequence system or positive phase-sequence system and for determining which of the first and second inverter modules is used to produce a positive phase-sequence system and which is used to produce a negative phase-sequence system.

17. The wind power installation as claimed in claim 16, wherein the wind power installation further includes a data bus system for communication between the at least one first and second inverter modules and for communication with the central control unit.

18. The wind power installation as claimed in claim 14, wherein the at least one first inverter module is a plurality of first inverters that are electrically coupled to the same first DC connection or different first DC connections and the at least one second inverter module is a plurality of second inverters that are electrically coupled to the same second DC connection or different second DC connections.

* * * * *